United States Patent Office 3,566,401
Patented Feb. 23, 1971

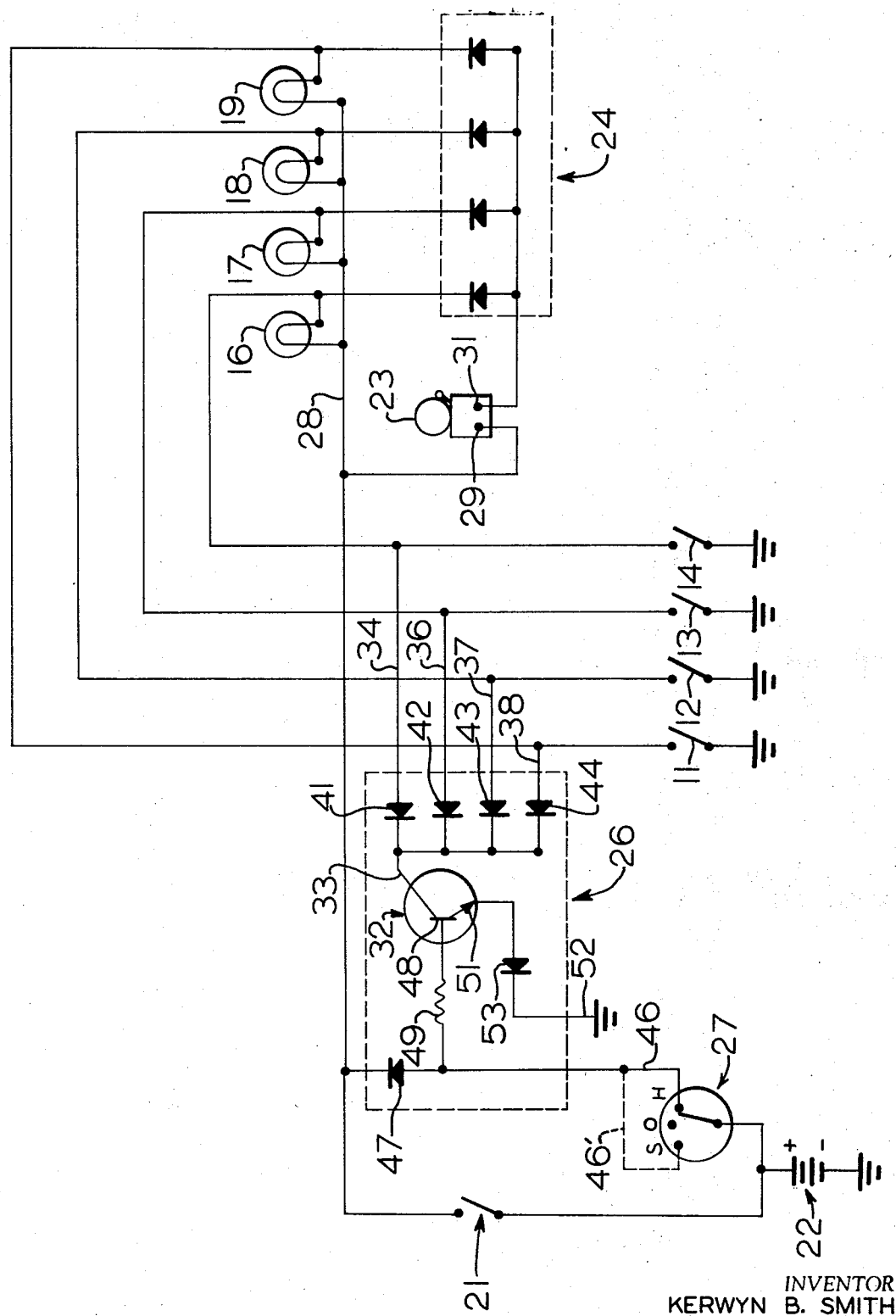

3,566,401
ENGINE WARNING CIRCUIT
Kerwyn B. Smith and James W. Thais, Decatur, Ill., assignors to Caterpillar Tractor Co., Peoria, Ill., a corporation of California
Filed July 29, 1968, Ser. No. 748,282
Int. Cl. G08b 23/00, 29/00
U.S. Cl. 340—411                                     3 Claims

ABSTRACT OF THE DISCLOSURE

An electrical warning circuit for a vehicular engine assembly having sensing switches responsive to various operating conditions and a separate visual signal means associated with each of the sensor switches. To determine if the signal means are in working order, testing means are effective to actuate all of the signal means automatically during engine startup and when desired during engine operation. A single audible alarm is actuated along with any one of the signal means in response to its associated sensor switch.

In various motor arrangements and particularly in vehicular engine assemblies, it is desirable to provide a warning system including signal means which are responsive to digressions of various operating conditions from desired operating limits. It is well known in the art to provide signal means which are responsive to the sensor switch means for warning the operator of abnormal operating conditions.

However, a problem arises when the signal means are not in proper working order and the operator is not aware of this fact so that damage may result from engine operation under undesirable conditions. Accordingly, the present invention provides means for automatically testing the signal means during start up.:

This represents only a partial solution to the problem however, since these engine assemblies may be employed in trucks or earthmoving equipment for example which are operated for long periods of time without shutting down the engine. The signal means may fail during these extended periods of operation so that the operator is unaware of the abnormal engine operating conditions. To overcome this problem, the invention provides means for actuating all of the signal means during engine operation when desired to determine if the signal means are in working order.

Where the signal means are for example, visual indicators, the operator may be concerned with operation of the vehicle so that he does not become aware of actuation of one of the signal means. Accordingly, the present invention includes alarm means, for example an audible indicator, which are also actuated to warn the operator of a possible malfunction. To simplify the warning circuit and reduce capital costs, single alarm means are actuatable simultaneously with any one of a plurality of signal means.

Additional objects and advantages of the invention are made apparent in the following description having reference to the accompanying drawing.

The drawing is a schematic representation of an electrical warning circuit including the novel features of the present invention.

Referring now to the drawing, the warning circuit is contemplated for use with a motor (not shown) having at least one sensor switch 11 responsive to an operating condition of the motor. Preferably, a plurality of the sensor switch means are employed, including those indicated at 12, 13 and 14 with the motor being an engine assembly in a diesel truck or other vehicle (not shown). In such a vehicular engine assembly, the sensor switches 11–14 may be respectively responsive for example to air pressure of an air-over-oil brake system, oil temperature of a torque converter, oil pressure in the engine and temperature of the engine cooling water.

Visual signal means such as the lamps indicated at 16, 17, 18 and 19 are each respectively associated with one of the sensor switches 11–14. A common switch 21 associates each of the signal lamps 16–19 with an electrical source such as the battery 22 during engine operation so that each of the signal lamps is actuatable in response to its respective sensor switch. A single audible alarm such as the bell or buzzer indicated at 23 is also associated with the common switch 21 and each of the signal lamps 16–19 so that the audible alarm 23 is actuated together with any one of the signal lamps in response to the associated sensor switch. A diode arrangement 24 separately communicates the audible alarm 23 with each of the signal lamps 16–19 so that upon closing of one of the sensor switches 11–14, only the associated signal lamp is actuated.

A testing assembly 26 is provided to permit automatic testing of the signal lamps 16–19 and the audible alarm 23 during engine startup and to permit selective testing of the same indicator during engine operation.

The warning circuit is described below for adaptation to a diesel engine where the common switch 21 is a conventional fuel pressure switch for the engine. A heat-start switch 27, which is also conventional for such engines, serves as a bypass switch for operating the testing circuit 26. To start the engine, the heat-start switch 27 is turned to its "Heat" position indicated at H to energize glow plugs (not shown) for the engine. After sufficient energization of the glow plugs, the switch 27 is turned to its "Start" position indicated at S for setting the engine in operation. After the engine starts, the switch 27 automatically returns to its spring centered "Off" position indicated at 0. The switch 21 is responsive to engine operation so that it closes generally at the same time that the switch 27 returns to its "Off" position.

To permit operation of the warning system while the engine is operating, the common switch 21 is electrically connected to the battery 22 and to a common line 28 which is electrically connected to one side of each of the signal lamps 16–19. Each of the signal lamps is also in series connection with its respective sensor switch 11–14. The audible alarm 23 also has one side 29 connected to the common line 28. The other side 31 of the audible alarm is connected with each of the signal lamps 16–19 through one of the diodes 24 respectively. In this manner, any one of the signal lamps is actuatable in response to its respective sensor switch while the audible alarm 23 is actuated together with any one of the signal lamps 16–19. One of the diodes 24 associated with the actuated signal lamp permits an electrical circuit to be completed through that lamp and the audible alarm while the remaining diode 24 prevents an electrical circuit from being formed through any of the other lamps. Thus, only the associated signal lamps is actuated in response to closing of any one of the sensor switches 11–14. If two or more of the sensor switches are simultaneously actuated, the diode arrangement permits each of the signal lamps associated with the closed sensor switches to also be simultaneously actuated together with the alarm 23.

To permit testing of the signal lamps 16–19 and the audible alarm 23, automatically or when desired the testing circuit 26 comprises a transistor 32 having its collector 33 separately interconnected by means of lines 34, 36, 37 and 38 between each of the signal lamps 16–19 and their associated sensor switches respectively. Diodes 41, 42, 43 and 44 are respectively connected across each of the lines 34–38 to serve a similar isolating and blocking function during engine operation as the diodes 24.

The heat-start switch 27 is connected to the battery 22. A line 46 is connected between the "Heat" position of the switch 27 and the common line 28 by means of a diode 47 so that the switch 27 is in bypass relation to the switch 21. The diode 47 prevents current from passing into the test circuit 26 when the switch 21 is closed during engine operation. The line 46 also may be connected to the "Start" position of the switch 27 by means of another line 46' shown as a broken line, so that the signal lamps 16–19 and the audible alarm 23 may be monitored until the engine is in actual operation. The output line 46 from the switch 27 is also connected to the transistor base 48 through a conventional biasing resistor 49 so that the transistor may be conditioned to permit current passage between its collector 33 and its emitter 51. The emitter 51 is connected to ground at 52 by means of a blocking diode 53 which protects the transistor 32 from transient voltage spikes which may be introduced into the warning circuit.

In operation, closing of the switch 27 forms an electrical circuit through the audible alarm 23 and each of the signal lamps 16–19. The transistor base 48 is suitably biased at the same time so that the circuits for the signal lamps and the audible alarm are completed through the testing circuits 26 to ground at 52. Although the switch 27 is automatically opened after the engine is in operation the signal lamps 16–19 and the audible alarm 23 may be similarly monitored at any time by momentary closing of the switch 27 to its "Heat" position H.

As the engine is set in operation, the switch 27 automatically opens and the switch 21 closes to communicate the battery 22 with the audible alarm 23 and each of the signal lamps 16–19. In this condition, closing of any one of the sensor switches 11–14 permits actuation of the associated signal lamps 16–19 together with the audible alarm 23. The diode arrangement 24 prevents actuation of any of the other signal lamps unless its associated sensor switch is also closed as discussed above.

What is claimed is:

1. An electrical warning circuit for providing a signal in response to a plurality of sensor switches respectively responsive to different operating conditions of a motor, comprising:
   an electrical source,
   a plurality of signal means in respective electrical series association with the source and each of the sensor switches during motor operation,
   single alarm means in separate electrical series association with the source and each of the signal means,
   a plurality of diode means each coupling one of the signal means to the alarm means, and
   test means coupled to the electrical source and the signal means, the test means being operable during motor startup and operable when desired during motor operation to actuate all of the signal means and the alarm means for determining if they are in working order.

2. An electrical warning circuit for providing a signal in response to a plurality of sensor switches, each responsive to a different operating condition of a motor, comprising:
   a plurality of signal means, each being associated with one of the sensor switches,
   a common switch for associating each of the signal means with the electrical source while the motor is operating, each of the signal means being in electrical series relation with the common switch and its respective sensor switch,
   single alarm means for simultaneous actuation along with any of the signal means,
   diode means separately arranged between the alarm means and each of the signal means to prevent actuation of more than one of the signal means in response to one of the sensor switches,
   test means coupled to each of the signal means and the electrical source, the test means comprising a transistor having its collector electrically coupled with each of the signal means through separate diode means, a bypass switch means to energize the transistor base, the bypass switch means being operable during motor startup and operable when desired during motor operation.

3. The warning circuit of claim 2 wherein the motor comprises a vehicular diesel engine, the signal means being visual indicators, the alarm means being an audible indicator, the bypass switch being a heat-start switch for the engine and the common switch being a fuel pressure switch for the engine.

References Cited

UNITED STATES PATENTS

| | | | |
|---|---|---|---|
| 2,845,614 | 7/1958 | Bell | 340—214 |
| 2,917,731 | 12/1959 | Rodgers | 340—214 |
| 3,128,457 | 4/1964 | Culbertson | 340—214 |

U.S. Cl. X.R.

340—176, 410